United States Patent
Wendt

(10) Patent No.: US 6,321,885 B1
(45) Date of Patent: Nov. 27, 2001

(54) COMPOSITE CAST BRAKE ELEMENTS, SUCH AS BRAKE DRUM, BRAKE DISK OR THE LIKE, AND COMPOSITE CASTING PROCESS FOR BRAKE ELEMENTS

(76) Inventor: Florian Wendt, Poststrasse 9, 09599 Frieberg (DE)

( * ) Notice: Subject to any disclaimer, the term of this patent is extended or adjusted under 35 U.S.C. 154(b) by 0 days.

(21) Appl. No.: 09/319,314
(22) PCT Filed: Nov. 29, 1997
(86) PCT No.: PCT/DE97/02794
§ 371 Date: Sep. 2, 1999
§ 102(e) Date: Sep. 2, 1999
(87) PCT Pub. No.: WO98/25045
PCT Pub. Date: Jun. 11, 1998

(30) Foreign Application Priority Data

Dec. 2, 1996 (DE) ............................................. 196 49 919

(51) Int. Cl.[7] .................................................. F16D 65/10
(52) U.S. Cl. ...................................... 188/218 X; 188/73.1
(58) Field of Search .................................. 188/73.1, 218; 148/138, 321, 2

(56) References Cited

U.S. PATENT DOCUMENTS

| | | | |
|---|---|---|---|
| 4,617,069 | * 10/1986 | Hornung et al. ...................... | 148/138 |
| 4,807,728 | * 2/1989 | Suenaga et al. .................. | 188/218 X |
| 4,961,791 | * 10/1990 | Metzler et al. ........................... | 148/2 |
| 5,107,966 | * 4/1992 | Metzler et al. ................... | 188/218 X |
| 5,109,960 | * 5/1992 | Gunther ............................. | 188/218 X |
| 5,407,035 | * 4/1995 | Cole et al. ......................... | 188/218 X |
| 5,509,510 | * 4/1996 | Ihm .................................. | 188/218 X |

FOREIGN PATENT DOCUMENTS

| | | |
|---|---|---|
| 2 263 654 | 7/1974 | (DE) . |
| 3 318 687 | 6/1989 | (EP) . |
| 60 24263 | 2/1985 | (JP) . |
| 60024263 | * 6/1985 | (JP) ..................................... 188/72.1 |

OTHER PUBLICATIONS

Keiner, et al.: "Hochgekohlter GrauguB GG–15 HC—Idealer Werkstoff fur Bremsscheiben und Bremstrommeln" Konstruieren + Gieben, vol. 15, No. 4 (1990) (No Translation).

\* cited by examiner

Primary Examiner—Robert J. Oberleitner
Assistant Examiner—Devon Kramer
(74) Attorney, Agent, or Firm—George W. Neuner; Dike, Bronstein, Roberts & Cushman, IP Practice Group of Edwards & Angell, LLP

(57) ABSTRACT

A composite casting process for the production of brake elements is described. The brake element has a hub and a flange for fastening to a vehicle wheel, and brake body component bearing a friction surface for interaction with brake jaws for braking The brake body component is made of a first cast iron material having lamellar graphite with a high resistance to thermal shocks, and the hub and the flange are made of a second cast iron material with a higher-grade tensile strength greater than the tensile strength of the first cast iron material. The brake body component is connected to the hub by forming a material union between the hub and the brake body component by casting a melt of one of the cast iron materials on a solid body of the other cast iron material that is placed into a mold cavity. After the casting of the melt forming the material union, which forms a juncture between the cast iron materials, a temperature is provided that is at least 10° C. above the solidus temperature of the cast iron material of the solid body. The invention aims at creating a composite cast union at the hub that resists thermal cracks or thermal stresses and is to be designed of light weight. A preferred brake element made by the process is reliable in operation, very resilient to thermal stresses and mechanically stable, exhibits an iron cast material for a brake ring or a brake drum body in interaction with brake jaws with a high resistance to thermal shocks and an iron cast material with a higher-grade tensile strength for the hub and the flange.

7 Claims, 2 Drawing Sheets

COMPOSITE CAST BRAKE ELEMENTS, SUCH AS BRAKE DRUM, BRAKE DISK OR THE LIKE, AND COMPOSITE CASTING PROCESS FOR BRAKE ELEMENTS

FIELD OF THE INVENTION

The present invention relates to brake elements produced by composite casting, such as a brake drum, brake disk or the like, and to a composite casting process for the production of such brake elements. In particular, the invention relates to the composite casting of brake elements, such as brake drums, brake disks or the like suitable for vehicles, the brake elements comprising a hub and a flange for the attachment to vehicle wheels. Preferably, a brake disk may consist of two brake ring disks that are united with each other by connecting bridges produced by casting, while leaving space for cooling or ventilation channels.

BACKGROUND OF THE INVENTION

Brake drums and brake disks of the type used in many cases in passenger cars and trucks by the motor vehicle industry are subjected to severe dynamic and mechanical stresses produced especially by high thermal shock stress. For instance, when driving motor vehicles down a long gradient with full braking in the mountains, temperatures of up to 800° C. are reached on the brake disks, which may lead with subsequent quick cooling to substantial stresses and thereafter to stress cracks. In practice, therefore, it is advisable to select for the brake disk or brake drum a cast iron material with lamellar graphite, exhibiting a high thermal and temperature conductivity as well as a low thermal expansion coefficient.

Such a high-carbon gray cast iron is described, for instance, in DE 37 40 912 A1. A disadvantage, however, is that this type of cast iron with lamellar graphite exhibits a low modulus of elasticity and a low tensile strength between 100 N/mm$^2$ and 150 N/mm$^2$. As a result, such materials are less suited for the area of the hub and the forming of the flange. According to W. Keiner, *Designing and Casting*15 (1990), No. 4, pages 4–14, the cross-section of heavy brake drums in these areas, especially at the junction to the flange, must be executed with a greater thickness of material and be reinforced by a few millimeters. The brake elements are, as a result, more or less weight-loaded.

Moreover, the hub and the flange are subjected to great dynamic stresses as a result of shocks and impacts, whereby the flange, as a result of thread tapping and the associated wheel bolts, exhibits already a lower strength, resulting, together with the notch effect emanating from the screws, in a reduction of the reverse bending strength.

In order to meet these requirements, it is common to produce brake drums or brake disks of high-grade iron-carbon alloys or other especially suited materials.

In order to reduce the expense in the production of a brake disk composed of various materials, it was suggested in DE 22 63 654 A1, to produce the concentric brake body arranged around the wheel hub in the form of a brake disk or a brake drum as a composite part in a uniform casting. For this purpose, the production of the hub starts with a drop forging of steel or with a cast iron part of spheroidal graphite. In order to improve the bond, a connecting bridge with recesses is provided which is designed as a revolving flange with a thin wall. A complete welding of the metal to the bridge is not envisioned in order to leave a small slot with a sound-absorbing effect between the sheet and the casting metal. On the other hand, a great quenching effect with respect to the cast iron flowing through and the formation of cementite is apparent in a thicker, revolving bridge. Subsequent annealing is therefore required, resulting in an increase of production costs. Furthermore, the smaller cross-section leads to a reduced transmission of power at the junction between the hub and the brake body, causing a substantial limitation in the area of application of the brake disk or the brake drum.

According to the proposed method, this brake element has a revolving parting line located between the brake body and the hub, which leads to heat accumulation during braking and prevents the flow of heat from the brake body towards the hub. The disadvantage is the resulting considerably greater expansion of the brake body in a radial direction which may eventually lead in the course of time to a destruction of the union of the hub with the brake body.

In order to increase the width of application of a brake disk or brake drum produced by composite casting, a durable composite cast union is necessary between the hub and the brake disk or the brake drum or the like, in order to transmit a maximal torque to the brake jaws when running down a long gradient with full braking.

JP A 60 024263 discloses an integrated rotor hub, in which a melting zone structure with good mechanical properties is to be developed at the border area between the rotor part and the hub part. In this production process, the two components are cast in a common mold but with different types of steel. The brake disk consists of cast iron with flaky graphite and with thermally favorable properties, although the hub part consists of a cast iron with spheroidal graphite and high mechanical strength. As a result of the common casting, the separation of the two casting materials is not distinct, and can lead to thermally or mechanically faulty stresses at the components of the brake element. The possible consequences are deformations and cracks presenting a safety risk.

SUMMARY OF THE INVENTION

The present invention concerns in particular brake drums, brake disks or the like for vehicles produced by composite casting, which resist thermal cracks and stresses and are of light weight. In preferred embodiments, the invention provides a brake element that is reliable in operation and of a cast iron material exhibiting high resilience to thermal stresses or thermal conductivity respectively, while exhibiting at the same time high mechanical strength and a high modulus of elasticity.

This invention provides a composite casting process for the production of brake elements, specifically brake drums, brake disks or the like, which comprise a hub and a flange for fastening, as well as the corresponding friction surfaces. If need be, a brake disk consists of two brake rings joined to each other by way of connecting bridges, while leaving space for cooling or ventilation channels. Typically, the friction surfaces comprising a brake ring (1) or a brake drum body, which interact with brake jaws, are made of a cast iron material with lamellar graphite with a tensile strength of between 100 N/mm$^2$ and 150 N/mm$^2$ with a high resistance to thermal shocks, and the hub (2) and the flange (4) are comprised of a cast iron material with a higher-grade tensile strength greater than 170 N/mm$^2$. In the present invention, the hub (2) is connected with the brake ring (1) or brake drum body by composite casting, forming a material union (5) which is formed by casting one melt of one cast iron material on a solid body of the other cast iron material placed into the mold cavity (a) by casting and cooling or (b)

by inserting a solid body and heating. After the casting of the melt at the material union (5), which forms the contact surface between the cast iron materials, a temperature is provided which lies at least 10° C. above the solidus temperature of the solid one of the adjoining cast iron materials of the hub (2) or the brake ring (1) or of the brake drum body. Prior to the casting of the melt, the open-lying sections of the solid body located in the mold cavity, i.e., the material union (5) earmarked for the cast-on, is coated with a non-metallic mixture of a reducing compound containing boron which protects against oxidation.

Certain preferred brake elements produced of a composite cast according to a casting process in accord with the present invention can be characterized by the fact that the hub (2) and the junction (12) are dimensioned in the area of the hub (2) so that the section modulus of torsion is stable with respect to the admissible stresses in the hub (2), depending on the stresses to be expected during braking and acceleration against torsion. Other preferred brake elements produced of a composite cast according to a casting process in accord with the present invention can be characterized by the fact that the hub (2) is produced of a cast iron material with a higher load carrying capacity and is elastically shaped according to the thermal stress.

The invention is predicated on the knowledge that a high mechanical load-carrying capacity based on the material composition of the cast iron material shall be connected with a comparably great danger of heat cracks. The danger of heat cracks exists, however, only in areas jeopardized by high temperature stress. These are the areas bordering directly on the brake ring or brake drum body heated during braking. This danger can be increased by an insufficient material union between the parts of the brake body and the hub participating in the energy transmission if the heat created during braking cannot be carried off quickly. The heat expansion of the brake ring or brake drum is greatest in these cases or under extreme stress.

Such heat expansions are transmitted to the hub and effect primarily an increase of the inside diameter of the hub and hub bore in the area of the brake disk. In contrast, the flange arranged on the opposite side of the hub is dimensionally stable because it warms up less, causing the hub to be subjected to a deformation between the flange and the brake disk, which is characterized less by thermal stresses than by tangential stresses and axial tensions. As was explained by W. Keiner elsewhere, brake disks with a flat pot in the junction between flange and pot are therefore subjected to a greater stress than those with a relatively high pot, which is caused primarily by the high torque acting on this section due to the expansion of the brake ring when heated up. Here, limits are set for materials with thermal loading capacity when rim installation and space conditions do not permit making changes in the design.

For the aforementioned reasons it is practical to produce the hub of a cast iron material with a higher load-carrying capacity and a greater mechanical strength. Because the yield point of the material decreases with rising temperature, which is accompanied by a reduction of the modulus of elasticity, the fatigue strength and operating ability of the hub can be substantially improved by elasticity of shape in the design under thermal stress. The elasticity of shape in the design is accompanied by a slimming down of the hub and the flange.

In a preferred embodiment of the invention, it is envisioned accordingly that the hub and the junction in the area of the hub exhibit comparatively a dimension of the cross-section that is on the average, smaller by one third, whereby the admissible stresses in the hub are dimensioned according to the torques expected and originating during braking and acceleration. This is followed by a substantial slimming down of the hub compared to the previously known brake elements, which is accompanied by a substantial reduction in weight. By composite casting it is thereby possible for the first time to produce lighter brake elements with a material optimized for brake drums and brake disks, which is especially well suited for the light-weight construction of vehicles and the saving of drive energy.

According to a preferred embodiment of the invention, it is envisioned that the brake disk ring or the brake drum body, respectively, consists of a cast iron material with lamellar graphite with a tensile strength of between 100 N/mm$^2$ and 150 N/mm$^2$, and the flange with the hub body and the hub are produced of cast iron material with a tensile strength greater than 170 N/mm$^2$. This ensures that the material compositions required for the individual case can be made available according to the design requirements.

In accord with another preferred embodiment of the invention, a method is provided to produce the brake elements by means of a composite casting process in which the second cast iron material of high resistance to thermal shocks (GG) forming the area of the brake disk ring or the brake drum respectively, is cast unto the body of the higher-strength cast iron material (GGG) to be inserted into a mold cavity, the latter forming the subsequent hub, so that a qualitatively flawless material union is formed in the transition of the hub and the brake disk or the brake drum, respectively. The body of the higher-strength cast iron material (GGG) can hereby be put into the mold cavity by casting or by inserting. In order to bring about a complete material union, it is furthermore envisioned to provide the areas of the hub body lying free in the form cavity prior to the casting with a non-metallic mixture of a boron-containing compound, the latter removing the oxides present on the surface and providing protection against oxidation at higher temperatures, and which is rinsed away during the casting process, and that after the casting of the melt on the body positioned in the mold cavity a temperature is provided at the contact surface between the two materials, which for more than one second lies at least 10° C. above the solidus temperature of one of the adjacent materials of the hub or the brake drum or the brake disk ring, respectively. The starting temperatures of the two cast iron materials, i.e., the temperature of the hub body in the mold cavity and the casting temperature of the melt to be cast on must be set accordingly.

The invention shall not be limited to the placing of the solid body into the mold cavity. Especially in connection with the production of a brake disk, the molding of a formed part of the solid body into the mold cavity represents a preferred variant. If the hub body is placed into the mold cavity by insertion (rather than by molding), the heating of the hub body inside or outside of the mold is consequently required, for instance by means of induction heating.

When the hub body is placed into the mold cavity by casting, cooling to the required temperature must be provided, at least, however, up to its solidification. The sequence of the production of the brake ring or the brake drum and the hub can be selected at random, in other words, the brake ring or the brake drum can also be placed first into the mold cavity instead of the hub, and the hub can be cast on with an otherwise identical procedure. If the starting temperatures of the two cast iron materials are selected in such a way that the self-adjusting equalizing temperature at the contact surfaces remains for a certain period above the solidus temperature of one of the materials, and if a metallic pure surface is guaranteed by the utilization of a non-metallic compound containing boron, a brake drum or brake disk with a flawless composite cast union between the hub and the brake ring or brake drum, respectively, can be obtained by the composite cast process, which shall be explained in the following in greater detail by means of an exemplified embodiment.

BRIEF DESCRIPTION OF THE DRAWINGS

The accompanying drawings show in

DETAILED DESCRIPTION OF THE INVENTION

Figure 1:
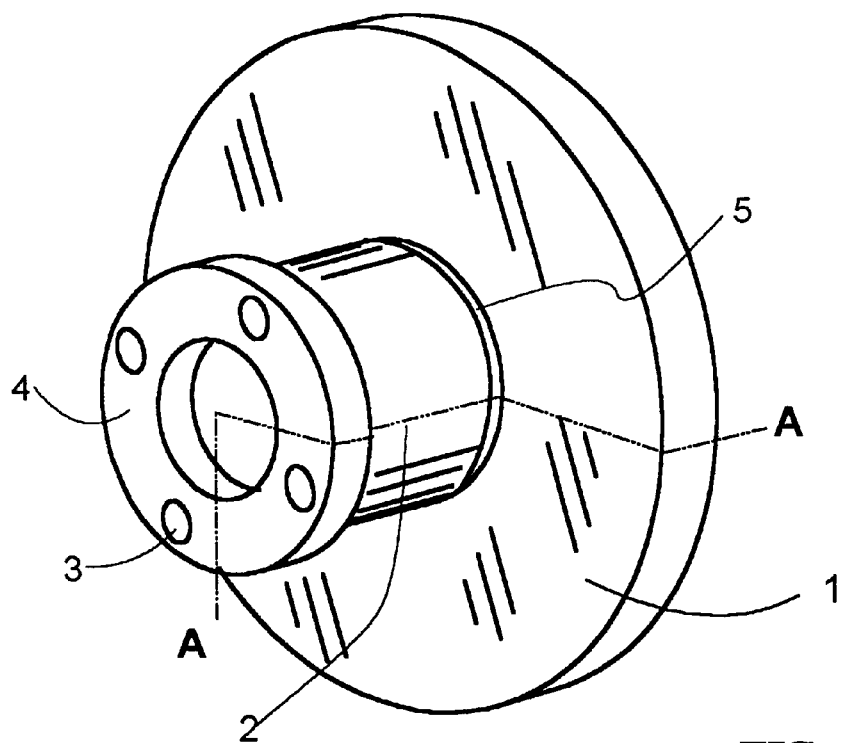
FIG. 1 a brake disk produced by composite casting, with a flange guided radially outward, FIG. 2 a brake disk with a flange guided radially inward, FIG. 3 a cross-section through a brake disk along the line of intersection A—A defined in FIG. 1, and FIG. 4 a casting mold for the production of a brake disk illustrated in FIG. 1, in schematic representation.

FIG. 1 shows in ample diagrammatic representation a brake disk exhibiting a brake ring 1 and a hub 2 adjacent to the brake ring 1 and essentially designed as a hollow cylinder. This hub possesses a flange 4 that is provided with mounting holes 3 and projects radially outward. The mounting holes 3 are designed for the fastening of wheel rims of motor vehicle wheels or of a similar vehicle.

Figure 2:
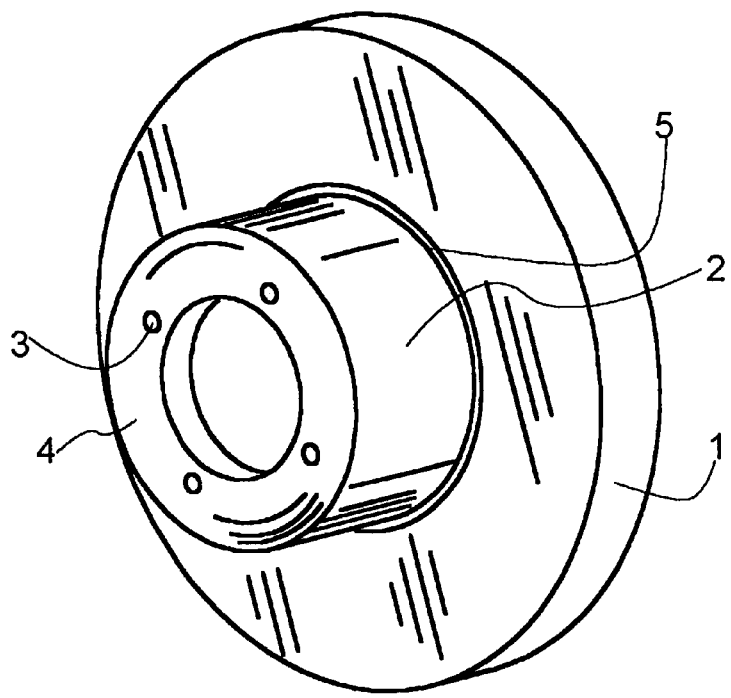

FIG. 2 shows a second embodiment of a brake disk with a flange 4 pointing radially inward. It is understood that the invention is not bound to the specific embodiments shown, as in the same way especially brake drums exhibit generally this form of construction which is characterized by a flange 4 and an adjoining pot-shaped hub 2 or pot-shaped brake body respectively.

The determining factor is that the hub 2 is made of a cast iron material with a greater mechanical strength than the brake ring 1 and, respectively, the brake drum not further defined here, and that a material union (5) is formed by composite casting between the hub 2 and the brake disk.

In conformity with the form of construction of a brake element, various material unions 5 are possible between the hub 2 and the brake ring 1. According to FIGS. 1–3 the material union 5 can be arranged at the joint between the brake ring 1 and the right front side of the hub 2. In a brake disk identifiable in FIG. 3 comprising a cut along the line A–A in FIG. 1, the brake ring 1 consists of two disk bodies 7 arranged parallel to each other and held together by a multitude of bridges 8 arranged alternating on the circumference. In this way, a ventilated brake disk is obtained.

In the exemplified embodiment rectangular-designed ventilation channels 9, running from the hub bore 10 to the outside circumferential surfaces 11 of the disk body 7, are left blank between the bridges 8. In this brake disk the material union 5 may be arranged in the manner of approach shown between the hub 2 and a disk body 7. Or the material union 5 is located, for instance, at the bridges 8 if the hub 2 is to be arranged in the center between the disk bodies 7. It is shown in that way, that more than one exclusive approach to the structuring of the material union 5 is available for the ventilated brake disks.

The material union 5 is preferably arranged in such a way that the high torque transmitted as a result of the heat expansion of the brake ring 1 is transmitted to the hub 2. Stress is thereby imposed on the hub 2 not only by torsion during braking but also by reversed bending. Because of the required tensile strength the hub 2 is produced of a cast iron material with a tensile strength greater than 170 N/mm². In contrast, a cast iron material with lamellar graphite and a tensile strength of between 100 N/mm² and 150 N/mm² is envisioned for the cast iron material of the brake ring 1 or a brake drum body respectively. Especially suitable are primarily cast iron materials with a high, coarsely laminated share of graphite, distinguished by low temperature stresses and great resistance against thermal cracks. Furthermore, the cast iron material acquires as a result a high temperature conductivity that assures that the heat created during braking is quickly carried off. As a result, the temperature differences can be held low in the entire brake disk.

The material union 5 between the brake ring 1 and the hub 2 created by the fusion of the two cast iron materials is especially well suited to facilitate a rapid heat dissipation. Overall, the free rotation of the brake ring 1 is, as a result, held within limits. The disadvantages of a higher temperature load of the hub material can be compensated by a slimmer design of the hub 2 and a leaner junction 12 between the flange 4 and the hub 2. For this purpose, the hub 2 is produced with a very thin wall and dimensioned in such a way that the section modulus of torsion is sufficiently stable with respect to the torsion occurring during braking and acceleration.

Figure 3:
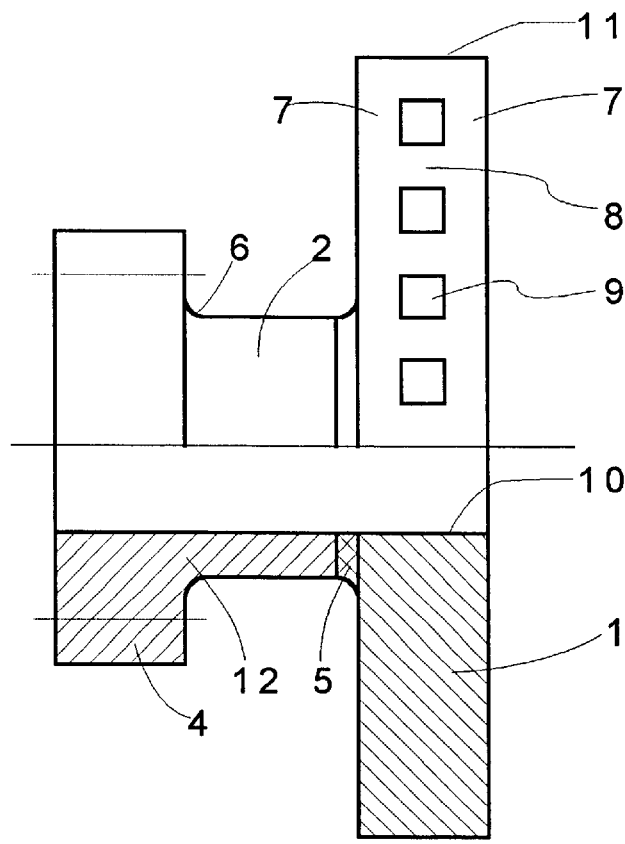
Figure 4:
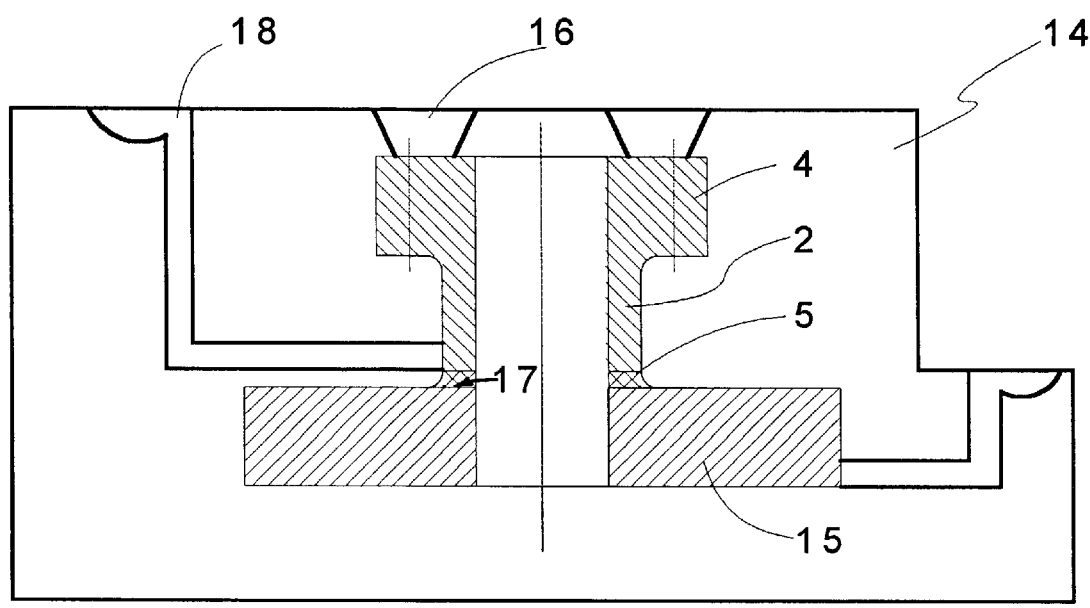

The production of a brake disk shown in FIG. 1 or FIG. 3 is performed by composite casting under utilization of a casting mold 14 illustrated in FIG. 4, in which the melts belonging to the hub 2 with the flange 4 and to the brake ring 1 are cast in order to obtain a qualitatively flawless material union. Reference is made, in this regard, to the description of the sequence of the process to the illustrated position of the brake disk. When the mold cavity for the brake disk is rotated by 180°, the sequence of the melt to be cast at first will change, which is, however, of no further significance for the result.

Accordingly, the mold cavity 15 for the brake ring 1 is filled first with a first melt envisioned for a cast iron material with lamellar graphite and a tensile strength of between 100 N/mm² and 150 N/mm². Subsequently, the melt is cooled until the cast iron material has attained a solid state. Thereafter, a non-metallic mixture with a layer thickness of between 0.5 and 1.5 mm is introduced by way of the feeder 16 at the arrow 17, this mixture consisting mainly of a compound containing boron and which is suitable to dissolve oxides formed at the open surface of the brake ring 1 during cooling, and to protect against further oxidation by preventing the passing through of oxygen to the surface. For the non-metallic mixture, a composition is to be considered which was produced of 54% $Na_2B_4O_7$, 38% $B_2O_3$, 4% $K_2ZrF_6$ and 4% $SiO_2$. After the spreading and acting of the non-metallic mixture on the surface, the second melt for the shaping of the hub 2 and the flange 4 is cast in over the gate 18. A cast iron material with a tensile strength greater than 170 N/mm² is envisioned for this melt. When casting the second melt the brake ring 1 may cool off only so far and the casting temperature must be controlled to the extent that a compensating temperature will be provided at the material union 5, which lies at least 10° C. above the solidus temperature of one of the cast iron materials for the brake ring 1 or for the hub 2 and the flange 4. This means that the casting temperature of the second melt and the temperature of the body in the mold cavity must be coordinated, taking into account the definite geometrical design and thermal properties of the system cast iron material 1—cast iron material 2—mold material in such a way that these conditions are met. During pouring of the second cast iron material the non-metallic mixture is displaced from the material union 5 and, due to its lower density in relation to the melt, deposited on the feeder 16. In this manner a flawless material union 5 between the brake ring 1 and the hub 2 is obtained which, even with a leaner cross-section of the hub, can ensure a safe transfer of the torques occurring during braking and heating up.

What is claimed is:

1. A composite casting process for the production of brake elements comprising a hub and a flange for fastening to a vehicle wheel, and brake body component bearing a friction surface for interaction with brake jaws for braking, the brake body component being made of a first cast iron material having lamellar graphite with a high resistance to thermal shocks, and the hub and the flange being made of a second cast iron material with a higher-grade tensile strength greater than the tensile strength of the first cast iron material, the process comprising the following steps:

inserting a cast iron material solid body, which is cooling or heating, into a mold cavity, coating a portion of the solid body located in the mold cavity where a material union is to be formed with a non-metallic mixture of a reducing compound containing boron, which protects against oxidation, casting a melt of the second cast iron into the mold cavity, and providing a temperature at the contact surface between the two materials that is at least for more than one second 10° C. above the solidus temperature of the cast iron material of the solid body to form a juncture between the cast iron materials, thereby connecting the brake body component to the hub by forming a material union between the hub and the brake body component.

2. The composite casting process of claim 1, wherein the first cast iron material has a tensile strength of between 100 N/mm$^2$ and 150 N/mm$^2$ and the second cast iron material has a tensile strength of at least 170 N/mm$^2$.

3. The composite casting process of claim 1, wherein the first cast iron material is placed into the mold cavity by casting and cooling the melt to a solid body.

4. The composite casting process of claim 1, wherein the first cast iron material is placed into the mold cavity as a the solid body and heating.

5. A composite cast brake element comprising a hub and a flange for fastening to a vehicle wheel, and brake body component bearing a friction surface for interaction with brake jaws for braking, the brake body component being made of a first cast iron material having lamellar graphite with a high resistance to thermal shocks, and the hub and the flange being made of a second cast iron material with a higher-grade tensile strength greater than the tensile strength of the first cast iron material, wherein the hub and the junction between the hub and the flange are structured and arranged with dimensions in the area of the hub so that the section modulus of torsion is stable with respect to the permitted stresses in the hub, which are determined based on the stresses calculated to be encountered during conditions of braking and acceleration against torsion, wherein a material union is formed between the hub and the brake body component by coating a solid body portion in a mold cavity with a non-metallic mixture of a reducing compound containing boron, which protects against oxidation, and casting a melt to the solid body portion located in the mold cavity.

6. The composite cast brake element of claim 5, wherein the brake body component is a brake disk comprised of two brake rings joined to each other by way of connecting bridges leaving spaces for cooling or ventilation channels.

7. The composite cast brake element of claim 5, wherein the first cast iron material has a tensile strength of between 100 N/mm$^2$ and 150 N/mm$^2$ and the second cast iron material has a tensile strength of at least 170 N/mm.

* * * * *